(No Model.)
W. YOUNG.
HEDGE FENCE.
No. 275,317. Patented Apr. 3, 1883.
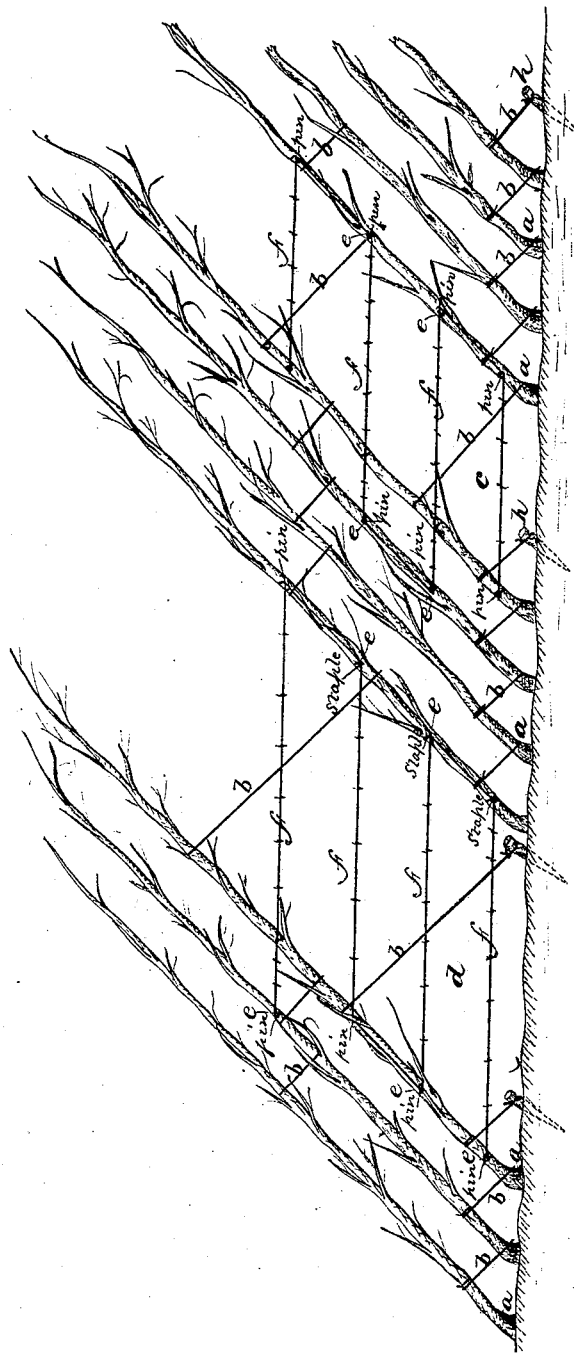
Attest,
W. H. H. Knight
W. Blackstock.
Inventor,
Wesley Young,
By Hill & Church,
His Attys.

UNITED STATES PATENT OFFICE.

WESLEY YOUNG, OF DAYTON, OHIO.

HEDGE-FENCE.

SPECIFICATION forming part of Letters Patent No. 275,317, dated April 3, 1883.

Application filed May 17, 1880. (No model.)

*To all whom it may concern:*

Be it known that I, WESLEY YOUNG, of Dayton, in the county of Montgomery and State of Ohio, have invented certain new and useful Improvements in Hedge-Fences; and I do hereby declare the following to be a full, clear, and exact description of the same, reference being had to the accompanying drawing, which forms a part of this specification, and in which the figure represents a section of fence, showing my improvement.

This invention relates to that class of hedge-fences in which the plants or canes are bent down in the plane of the fence and secured in that position by any suitable means.

In the construction of hedge-fences it is now the common practice to raise the hedge-plants in nurseries until they are one or two years old. They are then taken up and assorted (so as to set those of nearly uniform size together) and set out in the previously-prepared ground in the line of the proposed hedge-fence. There they are cultivated and cared for until they become of sufficient size for plashing. The plashing is preferably done (the side branches having been previously trimmed off from the plants or canes) by bending the plants or canes down in the plane of the fence and securing them in that position. The plants or canes should be bent in their roots so that their stalks shall stand straight above the surface of the ground and inclined at an angle of from forty to fifty degrees from the perpendicular. It sometimes happens that, previous to plashing, some of the plants become stunted, broken down, or killed, or die out, and their injury or removal from the hedge-row leaves spaces or openings, which render it impossible, when it comes to plashing the plants or canes, to make a regular and continuous fence that will, at every point, turn all kinds of stock.

The object of my invention is to obviate this difficulty; and to that end it consists in stretching lines of wire or other suitable material across the openings caused by the injury or removal of some of the plants set out in the line of the proposed fence, and securing them to the plants or canes. The wires should be placed in position and secured to the plants or canes at the time when the plashing is done, as at that time there are no side branches to prevent its being done readily and properly.

In the drawing, *a a* represent the live plants or canes bent down in the plane of the fence, and secured in position by means of the fastenings *b b*.

*c* represents a space or opening in the fence occasioned by the absence of a single plant or cane, and *d* a space or opening occasioned by the absence of several plants or canes.

*f f* represent lines of wire or other suitable material stretched across the spaces or openings, and secured to the plants or canes by suitable fastenings. The lines of wire are preferably provided with barbs to afford a more effectual barrier against stock.

I am aware that post-and-wire fences have been built along by the side of hedge-fences when the hedge-fences were insufficient for their intended purposes, that fences have been made by attaching wires to trees as posts, that a single line of wire has been attached to one side of a row of willows where they were small and insufficient to turn horses and cattle, and that a single line of wire has been attached to trees growing in the line of a hedge-fence and stretched above the top of the hedge-fence. In all these cases the trees to which the wires were attached were growing in their natural position. I am also aware that spaces or openings in hedge-fences have been filled by driving stakes into the ground along the line of the fence in such openings, and with rails, posts, and boards. Either of these methods prevents other plants from being set out and grown so as to successfully supply the places of those which have been injured or removed, while the stakes and rails or boards are liable to decay in a few years and leave the vacancies to be filled again. By the use of wires, as I have described, other plants may be set out, cultivated, and plashed in the vacancies, and thus irregular and unsightly hedges may be made regular and complete, the wires in the meantime protecting the plants set out to fill the vacancies without shading or otherwise hindering the growth or cultivation of the plants, and also rendering the fence stock-proof at all points as soon as it could have been done if no plants had been injured or removed. I do not claim any of these; but

I claim as my invention—

The herein-described improvement in the construction of that class of hedge-fences in which the plants or canes are plashed by being bent down in the plane of the fence, and secured by suitable fastenings consisting in stretching, at the time of plashing, a line or lines of wire across the spaces or openings occasioned by the injury or removal of some one or more of the plants, and securing said line or lines of wire directly to the plants by suitable fastenings, substantially as described, for the purpose specified.

WESLEY YOUNG.

Witnesses:
D. W. NORRIS,
RALPH BULKLEY.